United States Patent
Zhang

(10) Patent No.: US 11,102,811 B2
(45) Date of Patent: Aug. 24, 2021

(54) METHOD AND DEVICE USED FOR WIRELESS COMMUNICATION

(71) Applicant: SHANGHAI LANGBO COMMUNICATION TECHNOLOGY COMPANY LIMITED, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/533,804

(22) Filed: Aug. 7, 2019

(65) Prior Publication Data

US 2019/0364595 A1 Nov. 28, 2019

Related U.S. Application Data

(63) Continuation of application No. PCT/CN2018/075224, filed on Feb. 5, 2018.

(30) Foreign Application Priority Data

Feb. 7, 2017 (CN) .......................... 201710067491.5

(51) Int. Cl.
*H04W 74/04* (2009.01)
*H04L 1/00* (2006.01)
(Continued)

(52) U.S. Cl.
CPC ........... *H04W 74/04* (2013.01); *H04L 1/0038* (2013.01); *H04L 5/0094* (2013.01); *H04W 74/0833* (2013.01)

(58) Field of Classification Search
CPC .............. H04W 74/04; H04W 74/0833; H04L 5/0094; H04L 1/0038
(Continued)

(56) References Cited

U.S. PATENT DOCUMENTS

| 9,497,742 B2* | 11/2016 | Gao ...................... H04L 5/0057 |
| 2015/0208408 A1* | 7/2015 | Berggren .............. H04L 1/1861 370/329 |
| 2018/0212651 A1* | 7/2018 | Li ........................ H04B 7/0417 |

FOREIGN PATENT DOCUMENTS

| CN | 104838713 A | 8/2015 |
| CN | 105992361 A | 10/2016 |
| WO | 2017011944 A1 | 1/2017 |

OTHER PUBLICATIONS

CN First Search Report in application No. 201710067491.5 dated Jul. 11, 2019.
(Continued)

*Primary Examiner* — Faisal Choudhury
(74) *Attorney, Agent, or Firm* — Maschoff Brennan

(57) ABSTRACT

The present disclosure discloses a method and a device in wireless communication. A User Equipment receives first information; and then transmits a first radio signal; and transmits a second radio signal. The first information comprises P1 piece(s) of configuration information, each of which is used to determine first-type resources, a first-type integer, and a first-type set; the first radio signal and the second radio signal comprises M1 first and M2 second radio sub-signal(s), respectively; the M2 is an element within a target set which is a positive integer; time-frequency resources occupied by the first radio signal belong to the first-type resources determined by first configuration information, the M1 is the first-type integer determined by the first configuration information, the target set is the first-type set determined by the first configuration information. The
(Continued)

present disclosure provides a method of determining a number of non-grant uplink repeated transmissions while avoiding timing confusion.

16 Claims, 11 Drawing Sheets

(51) Int. Cl.
*H04L 5/00* (2006.01)
*H04W 74/08* (2009.01)

(58) Field of Classification Search
USPC .......................................................... 370/329
See application file for complete search history.

(56) References Cited

OTHER PUBLICATIONS

CN First Office Action in Application No. 201710067491.5 dated Jul. 19, 2019.
CN Notice of Allowance in Application No. 201710067491.5 dated Sep. 27, 2019.
ISR received in application No. PCT/CN2018/075224 dated Apr. 20, 2018.

\* cited by examiner

METHOD AND DEVICE USED FOR WIRELESS COMMUNICATION

CROSS-REFERENCE TO RELATED APPLICATION

This application is a continuation of International Application No. PCT/CN2018/075224, filed Feb. 5, 2018, claiming the priority benefit of Chinese Patent Application Serial Number 201710067491.5, filed on Feb. 7, 2017, the full disclosure of which is incorporated herein by reference.

BACKGROUND

Technical Field

The present disclosure relates to methods and devices in wireless communication systems, and in particular to a Grant-Free transmission scheme and device.

Related Art

In existing Long Term Evolution (LTE) systems, the dynamic scheduling of uplink data is completed on the basis of uplink Grant. In Downlink Control Information (DCI) corresponding to uplink Grant there exists a Resource Block Assignment Field dynamically indicating at least one of frequency domain resources or time domain resources occupied by uplink data.

In the future mobile communication system, in order to reduce control signaling overhead and scheduling delay, uplink data transmission based on Grant-Free will be employed, and also the corresponding mode of resources allocation will need to be redesigned. In Grant-Free uplink transmission, a simple implementation is to make each UE occupy a time-frequency resource of the same size when transmitting data. The complexity of reception by the base station can be reduced in this way, though, for UE, only a fixed number of bits can be transmitted in an uplink transmission, thus decreasing the flexibility thereof.

SUMMARY

In view of the above problem, the present disclosure provides a solution. It should be noted that the embodiments of the present disclosure and the characteristics in the embodiments may be mutually combined if no conflict is incurred. For example, the embodiments of a User Equipment in the present disclosure and the characteristics in the embodiments may be applied to a base station if no conflict is incurred, and vice versa.

The present disclosure discloses a method in a User Equipment (UE) for wireless communication, comprising:
  receiving first information;
  transmitting a first radio signal; and
  transmitting a second radio signal;
  wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; a time-frequency resource occupied by the second radio signal is related to at least one of the time-frequency resource occupied by the first radio signal or the first sequence.

In one embodiment, in the above method, a one-to-one correspondence relationship between the first-type integer and the first-type set is established so that a receiver of the second radio signal can determine the target set based on the M1 and/or time-frequency resources occupied by the first radio signal, which helps prevents a problem of waste of resources and timing mismatch caused by ambiguity in a deadline for transmission of the second radio signal.

In one embodiment, the above aspect saves control information used for resource allocation of the second radio signal, thus enhancing transmission efficiency.

In one embodiment, in the above method, a time-frequency resource occupied by the second radio signal is implicitly configured, thus saving uplink control information (UCI).

In one embodiment, in the above method, a range of values of elements in the first-type set are related to the corresponding first-type integer, thus saving the overhead of the first information.

In one embodiment, the first type resource comprises time-frequency resource.

In one embodiment, the first type resource comprises a positive integer number of Physical Resource Block(s) (PRB(s)).

In one embodiment, a subcarrier spacing of a subcarrier occupied by the first type resource in frequency domain within a given time is no greater than 180 kHz, the first type resource comprises multiple milliseconds.

In one embodiment, the first type resource comprises a positive integer number of Resource Element(s) (RE(s)). The RE(s) occupies(occupy) a subcarrier in frequency domain and a multicarrier symbol in time domain.

In one embodiment, the multicarrier symbol is an Orthogonal Frequency Division Multiplexing (OFDM) symbol.

In one embodiment, the multicarrier symbol is a Filtering Bank Multiple Carrier (FBMC) symbol.

In one embodiment, the multicarrier symbol is a Single Carrier Frequency Division Multiple Access (SC-FDMA) symbol.

In one embodiment, an RE occupied by the first radio signal is an RE occupied by the first type resource determined by the first configuration information.

In one embodiment, the first-type set consists of one element.

In one embodiment, the first-type set consists of multiple elements, wherein any two elements in the first-type set are unequal.

In one embodiment, the P1 is greater than 1, the first-type integer indicated by one of any two of the P1 pieces of configuration information is different from the first-type integer indicated by the other of the any two of the P1 pieces of configuration information.

In one embodiment, the P1 is greater than 1, there exist two pieces of the configuration information in the P1 pieces of configuration information that indicate the first-type sets with different numbers of elements.

In one embodiment, the P1 is greater than 1, there exist two pieces of configuration information out of the P1 pieces of configuration information that indicate the first-type sets with (a) shared element(s) (namely, the intersection of the two first-type sets is not an empty set).

In one embodiment, the P1 is greater than 1, the intersection of the first-type sets indicated by any two pieces of the configuration in the P1 pieces of configuration is an empty set.

In one embodiment, a channel quality between the UE and a receiver of the first radio signal is used to determine the first configuration information out of the P1 pieces of configuration information.

In one embodiment, the channel quality includes Reference Signal Receiving Power (RSRP).

In one embodiment, the channel quality includes Reference Signal Receiving Quality (RSRQ).

In one embodiment, the first sequence is a pseudo random sequence.

In one embodiment, the first sequence is a Zadoff-Chu sequence.

In one embodiment, the first sequence comprises Cyclic Prefix (CP).

In one embodiment, all elements in the first sequence are the same.

In one embodiment, all elements in the first sequence are 1.

In one embodiment, the first radio signal is transmitted on a Physical Random Access Channel (PRACH).

In one embodiment, the target set is composed of one element (i.e., the M2).

In one embodiment, the target set is composed of multiple elements.

In one embodiment, a receiver of the second radio signal determines the M2 out of the target set through blind detection.

In one embodiment, the first sequence is used to determine an index of the M2 in the target set.

In one embodiment, an index of the first sequence in a candidate sequence set is used to determine the M2 out of the target set, the candidate sequence set comprises multiple candidate sequences.

In one embodiment, the length of the candidate sequence is related to a number of REs occupied by the first radio signal.

In one embodiment, all of the candidate sequences in the candidate sequence set are of the same length (i.e., a number of elements).

In one embodiment, the first bit block is transmitted from a higher layer of the UE to a physical layer of the UE.

In one embodiment, the higher layer is a Media Access Control (MAC) layer.

In one embodiment, the higher layer is a Radio Link Control (RLC) layer.

In one embodiment, the M1 is a positive integer number power of 2 or is 1.

In one embodiment, the M2 is a positive integer number power of 2 or is 1.

In one embodiment, the first bit block is a Transmission Block (TB).

In one embodiment, the first bit block is transmitted on an UpLink Shared Channel (UL-SCH).

In one embodiment, the second radio signal is transmitted on a Physical Uplink Shared Channel (PUSCH).

In one embodiment, the second radio signal is an output after the first bit block is sequentially subjected to Channel Coding, a Modulation Mapper, a Layer Mapper, Precoding, a Resource Element Mapper and Orthogonal Frequency Division Multiplexing (OFDM) symbol Generation.

In one embodiment, the channel coding comprises rate matching.

In one embodiment, transmission of the first radio signal is Grant-Free.

In one embodiment, transmission of the first radio signal is Contention-Based.

In one embodiment, the first information is dynamically configured.

In one embodiment, the first information is semi-statically configured.

In one embodiment, the first information is configured by a Radio Resource Control (RRC) layer signaling.

In one embodiment, the first information is cell-common.

In one embodiment, the configuration information explicitly indicates the first type resource and the first-type set, the first-type integer is implicitly indicated by the first type resource.

In one sub-embodiment of the above embodiment, the first-type integer is related to a number of REs comprised in the first type resource.

In one embodiment, the configuration information explicitly indicates the first type resource, the first-type integer and the first-type set.

In one embodiment, time domain resources occupied by any two of the M1 first radio sub-signals are orthogonal (i.e., non-overlapping), time domain resources occupied by any two of the M2 second radio sub-signals are orthogonal (i.e., non-overlapping).

In one embodiment, a length of the first sequence is configured by a downlink higher-layer signaling.

In one embodiment, for a given time, the first type resource occupies at most one subcarrier in frequency domain.

In one embodiment, P1 of the first type resource(s) is(are) respectively indicated by the P1 piece(s) of configuration information, the P1 first type resource(s) occupies(occupy) an equal number of subcarriers occupied by one multicarrier symbol.

In one embodiment, the first sequence is a Preamble.

In one embodiment, a transmission channel for the first radio signal is a Random Access Channel (RACH).

In one embodiment, the first radio signal is transmitted on a Narrow band Physical Random Access Channel (NPRACH).

In one embodiment, the second radio signal is transmitted on a Narrow band Physical Uplink Shared Channel (NPUSCH).

In one embodiment, all second radio sub-signals of the M2 second radio sub-signals have the same Redundancy Version (RV).

In one embodiment, there exist two second radio sub-signals in the M1 second radio sub-signals that have different RVs.

In one embodiment, the RV of each second radio sub-signal in the M2 second radio sub-signals is related to the M2.

According to one aspect of the present disclosure, further comprising:
  receiving a third radio signal;
  wherein the third radio signal is used for at least one of determining whether the first bit block needs to be retransmitted, adjusting transmission timing for the UE, allocating resources of an uplink transmission to the UE, or configuring a subcarrier spacing of an uplink transmission for the UE; M3 is used to determine at least one of a start time for a transmission of the third radio signal or time domain resources occupied by the third radio signal, the M3 is an element within the target set.

In one embodiment, in the above aspect, the target set is used to determine a time domain resource occupied by the third radio signal. The above aspect enables the third radio signal to be detected by a receiver and, in the meantime, consumes less control information used to determine a transmission time of the third radio signal.

In one embodiment, the M3 is a maximum value in the target set.

The above embodiment avoids uncertainty of start time for the third radio signal resulted from multiple elements in the target set.

In one embodiment, the M3 is a minimum value in the target set.

The above embodiment avoids uncertainty of start time for the third radio signal resulted from multiple elements in the target set and supports early decoding at the same time.

In one sub-embodiment of the above embodiment, an end time for a time domain resource occupied by the third radio signal is related to a maximum value in the target set.

In one embodiment, a position of the M3 in the target set is determined.

In one embodiment, the M3 is the M2.

In one sub-embodiment of the above embodiment, the M3 is used to determine a start time for the time domain resource occupied by the third radio signal.

In one embodiment, a first time window occupied by the third radio signal is the K-th time window after a reference time window, the K is a positive integer. The reference time window is a last time window occupied by the M3-th second radio sub-signal in the second radio signal. The K is a positive integer.

In one sub-embodiment of the above embodiment, the K is related to the M3.

In one sub-embodiment of the above embodiment, the K is related to the M1.

In one sub-embodiment of the above embodiment, duration time of the time window is less than 1 ms.

In one sub-embodiment of the above embodiment, the time window is a subframe.

In one sub-embodiment of the above embodiment, the time window comprises a positive integer number of OFDM symbol(s).

In one embodiment, the third radio signal is transmitted on a physical layer control channel (i.e., a physical layer channel that can only bear physical layer control information).

In one sub-embodiment of the above embodiment, the third radio signal comprises DCI.

In one embodiment, the third radio signal is transmitted on a physical layer data channel (i.e., a physical layer channel that can bear physical layer data).

In one sub-embodiment of the above embodiment, the third radio signal comprises Random Access Response (RAR).

According to one aspect of the present disclosure, wherein a virtual radio signal comprises M3 second radio sub-signal(s), a length of a time interval between an end time for a transmission of the virtual radio signal and a start time for the transmission of the third radio signal is greater than or equal to a target time length, the target time length is equal to one of a first alternative time length or a second alternative time length, the first alternative time length is greater than the second alternative time length, the second alternative time length is greater than 0 ms; a reference time length is greater than or equal to a first threshold and the target time length is equal to the first alternative time length, or, the reference time length is less than the first threshold and the target time length is equal to the second alternative time length; the reference time length is related to at least the first one of the M3, a number of RUs occupied by the second radio sub-signal, or a subcarrier spacing of RUs occupied by the second radio sub-signal. The first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

In one embodiment, the first alternative time length is equal to 40 ms.

In one embodiment, the second alternative time length is equal to 3 ms.

In one embodiment, the second alternative time length is equal to 2 ms.

In one embodiment, the first alternative time length is equal to 40 subframes.

In one embodiment, the second alternative time length is equal to 3 subframes.

In one embodiment, the second alternative time length is equal to 2 subframes.

In one embodiment, the first alternative time length is pre-defined.

In one embodiment, the second alternative time length is pre-defined.

In one embodiment, the target time length does not comprise a Guard Time (GT) between the end time for reception of the second radio signal and the boundary of a subframe.

In one embodiment, the first threshold is equal to 256 ms.

In one embodiment, the virtual radio signal is the second radio signal.

In one embodiment, an end time for the virtual radio signal is later than an end time for the second radio signal.

In one embodiment, the reference time length is a time length corresponding to X consecutive subframes in time domain. An end subframe in the X subframes is an end subframe of the virtual radio signal, the virtual radio signal comprises M3 of the second radio sub-signal(s). The virtual radio signal occupies each subframe of the X subframes in time domain, a subframe before the X subframes in time domain is outside the subframes occupied by the virtual radio signal.

In one embodiment, the reference time length is a time length corresponding to Y consecutive slots in time domain. An end slot in the Y slots is an end slot of the virtual radio signal, the virtual radio signal comprises M3 of the second radio sub-signal(s). The virtual radio signal occupies each slot of the Y slots, a slot before the Y slots in time domain is outside the slots occupied by the virtual radio signal.

In one embodiment, the reference time length comprises time of deferred transmission for the avoidance of collision with a possible Physical Random Access Channel (PRACH).

In one embodiment, the reference time length comprises time of deferred transmission for the avoidance of collision with a possible Narrow band Physical Random Access Channel (NPRACH).

In one embodiment, the number of RUs in the second radio sub-signal(s) is equal to one of 1, 2, 3, 4, 5, 6, 8 and 10.

In one embodiment, the subcarrier spacing of RUs occupied by the second radio sub-signal is one of 3.75 kHz and 15 kHz.

According to one aspect of the present disclosure, further comprising:

receiving second information;

wherein the second information is used to determine P2 second-type resources; radio resources occupied by the second radio signal belong to one of the P2 second-type resources, the P2 is a positive integer; at least one of a number of subcarriers, a subcarrier spacing, an MCS, or an RV corresponding to the second radio signal is related to the second-type resources where the second radio signal belongs; radio resources comprise at least the former of time-frequency resources and code-domain resources.

In one embodiment, in the above aspect, the number of subcarriers occupied by the second radio signal is implicitly indicated, thereby saving corresponding control information and improving transmission efficiency.

In one embodiment, numbers of subcarriers occupied by radio signals transmitted in the P2 second-type resources respectively correspond to P2 positive integers.

In one embodiment, any two positive integers of the P2 positive integers are unequal.

In one embodiment, the subcarriers occupied by the second radio signal are consecutive in frequency domain.

In one embodiment, the Modulation Coding Scheme (MCS) supports at least one of QPSK, pi/2 BPSK, pi/4 QPSK, 16QAM or 64QAM.

In one embodiment, the MCS supports Turbo coding.

In one embodiment, the second radio signal supports two RVs.

In one embodiment, the second radio signal supports four RVs.

In one embodiment, the second information is semi-statically configured.

In one embodiment, the second information is carried by an RRC layer signaling.

In one embodiment, the second information is cell-common.

In one embodiment, the second information is specific to a Transmission Reception Point (TRP).

In one embodiment, the second information is Beam-specific, or the first information is specific to Beam-Group.

In one embodiment, the second information and the first information are transmitted via a same signaling.

In one embodiment, a subcarrier spacing of subcarriers occupied by the second radio signal is one of 2.5 kHz, 3.75 kHz, 15 kHz, 30 kHz, 60 kHz, 120 kHz, 240 kHz and 480 kHz.

In one embodiment, a subcarrier spacing of subcarriers occupied by the second radio signal is related to an index of the first sequence in a candidate sequence set. The candidate sequence set comprises multiple candidate sequences.

In one embodiment, the length of the candidate sequence is not related to the number of REs occupied by the first radio signal.

In one embodiment, all the candidate sequences in the candidate sequence set are of the same length.

According to one aspect of the present disclosure, further comprising:

receiving a fourth radio signal;

wherein a measurement on the fourth radio signal is used to determine at least one of the time-frequency resources occupied by the first radio signal, or the radio resources occupied by the second radio signal.

In one embodiment, the M1 and the target set are both related to the measurement on the fourth radio signal. The above aspect minimizes scheduling restrictions led by a connection between the M1 and the target set.

In one embodiment, the fourth radio signal includes at least one of a Primary Synchronization Signal (PSS) or a Secondary Synchronization Signal (SSS).

In one embodiment, the fourth radio signal includes at least one of a Narrow band Primary Synchronization Signal (NPSS) or a Narrow band Secondary Synchronization Signal (NSSS).

In one embodiment, the fourth radio signal includes a Cell Reference Signal (CRS).

In one embodiment, the fourth radio signal includes a Narrow band Reference Signal (NRS).

In one embodiment, the fourth radio signal includes a Channel Status Information Reference Signal (CSI-RS).

The present disclosure discloses a method in a base station for wireless communication, comprising:

transmitting first information;

receiving a first radio signal; and receiving a second radio signal;

wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; the first configuration information is one of the P1 piece(s) of configuration information; a time-frequency resource occupied by the second radio signal is related to at least one of the time-frequency resource occupied by the first radio signal or the first sequence.

According to one aspect of the present disclosure, further comprising:

transmitting a third radio signal;

wherein the third radio signal is used for at least one of determining whether the first bit block needs to be retransmitted, adjusting transmission timing for a transmitter of the second radio signal, allocating resources of an uplink transmission to the transmitter of the second radio signal, or configuring a subcarrier spacing for an uplink transmission for the transmitter of the second radio signal; M3 is used to determine at least one of a start time for a transmission of the third radio signal or time domain resources occupied by the third radio signal, the M3 is an element within the target set.

According to one aspect of the present disclosure, wherein a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms; a reference time length is greater than or equal to a first threshold and the target time length is equal to the first alternative time length, or, the reference time length is less than the first threshold and the target time length is equal to the second alternative time length; the reference time length is related to at least the first one of the M3, a number of RUs occupied by the second radio sub-signal, or a subcarrier spacing of RUs occupied by the second radio sub-signal. The first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

According to one aspect of the present disclosure, further comprising:

transmitting second information;

wherein the second information is used to determine P2 second-type resources; radio resources occupied by the second radio signal belong to one of the P2 second-type resources, the P2 is a positive integer; at least one of a number of subcarriers, a subcarrier spacing, an MCS, or an RV corresponding to the second radio signal is related to the second-type resources where the second radio signal belongs; radio resources comprise at least the former of time-frequency resources and code-domain resources.

According to one aspect of the present disclosure, further comprising:

transmitting a fourth radio signal;

wherein a measurement on the fourth radio signal is used to determine at least one of the time-frequency resources occupied by the first radio signal, or the radio resources occupied by the second radio signal.

The present disclosure discloses a UE for wireless communication, comprising:

a first receiver, receiving first information;

a first transmitter, transmitting a first radio signal; and a second transmitter, transmitting a second radio signal;

wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; the first configuration information is one of the P1 piece(s) of configuration information; a time-frequency resource occupied by the second radio signal is related to at least one of the time-frequency resource occupied by the first radio signal or the first sequence.

In one embodiment, the above UE for wireless communication is characterized by further comprising:

a second receiver, receiving a third radio signal;

wherein the third radio signal is used for at least one of determining whether the first bit block needs to be retransmitted, adjusting transmission timing for the UE, or allocating resources of an uplink transmission for the UE; M3 is used to determine at least one of a start time for a time domain resource occupied by the third radio signal or a time domain resource occupied by the third radio signal, the M3 is an element within the target set.

In one embodiment, the above UE for wireless communication is characterized in that a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms; a reference time length is greater than or equal to a first threshold and the target time length is equal to the first alternative time length, or, the reference time length is less than the first threshold and the target time length is equal to the second alternative time length; the reference time length is related to at least the first one of the M3, a number of RUs occupied by the second radio sub-signal, or a subcarrier spacing of RUs occupied by the second radio sub-signal. The first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

In one embodiment, the above UE for wireless communication is characterized in that the first receiver also receives second information; wherein the second information is used to determine P2 second-type resources; radio resources occupied by the second radio signal belong to one of the P2 second-type resources, the P2 is a positive integer; at least one of a number of subcarriers, a subcarrier spacing, an MCS, or an RV corresponding to the second radio signal is related to the second-type resources where the second radio signal belongs; radio resources comprise at least the former of time-frequency resources and code-domain resources.

In one embodiment, the above UE for wireless communication is characterized in that the first receiver also receives a fourth radio signal; wherein a measurement on the fourth radio signal is used to determine at least one of the time-frequency resources occupied by the first radio signal, or the radio resources occupied by the second radio signal.

The present disclosure discloses a base station for wireless communication, comprising:

a third transmitter, transmitting first information;

a third receiver, receiving a first radio signal; and a fourth receiver, receiving a second radio signal;

wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; the first configuration information is one of the P1 piece(s) of configuration information; a time-frequency resource occupied by the second radio signal is related to at least one of the time-frequency resource occupied by the first radio signal or the first sequence.

In one embodiment, the above base station for wireless communication is characterized by further comprising:

a fourth transmitter, transmitting a third radio signal; wherein the third radio signal is used for at least one of determining whether the first bit block needs to be retransmitted, adjusting transmission timing for the UE, allocating resources of an uplink transmission for the UE, or configuring a subcarrier spacing of an uplink transmission for the UE; M3 is used to determine at least one of a start time for a transmission of the third radio signal or time domain resources occupied by the third radio signal, the M3 is an element within the target set.

In one embodiment, the above base station for wireless communication is characterized in that a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms; a reference time length is greater than or equal to a first threshold and the target time length is equal to the first alternative time length, or, the reference time length is less than the first threshold and the target time length is equal to the second alternative time length; the reference time length is related to at least the first one of the M3, a number of RUs occupied by the second radio sub-signal, or a subcarrier spacing of RUs occupied by the second radio sub-signal. The first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

In one embodiment, the above base station for wireless communication is characterized in that the third transmitter also transmits second information; wherein the second information is used to determine P2 second-type resources; radio resources occupied by the second radio signal belong to one of the P2 second-type resources, the P2 is a positive integer; at least one of a number of subcarriers, a subcarrier spacing, an MCS, or an RV corresponding to the second radio signal is related to the second-type resources where the second radio signal belongs; the radio resources comprise at least the former of time-frequency resources and code-domain resources.

In one embodiment, the above base station for wireless communication is characterized in that the third transmitter also transmits a fourth radio signal; wherein a measurement on the fourth radio signal is used to determine at least one of the time-frequency resources occupied by the first radio signal, or the radio resources occupied by the second radio signal.

In one embodiment, compared with prior art, the present disclosure has the following technical advantages:

a one-to-one correspondence relationship is built between configuration of a random access channel and a set of times of repetition of a subsequent data channel, so that the set of times of repetition can be determined based on the configuration of the random access channel when the data channel is received, which helps prevent the problem of resource waste and timing mismatch caused by ambiguity in the number of times of repeated transmission of the data channel;

radio resources occupied by uplink control information in Grant-Free communications are cut down to improve transmission efficiency;

a base station is able to implement flexible configuration consistent with the present transmission situation by indicating first-type integers and corresponding first-type sets.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments in the present disclosure and the characteristics of the embodiments may be arbitrarily combined if no conflict is caused.

Embodiment 1

Figure 1:
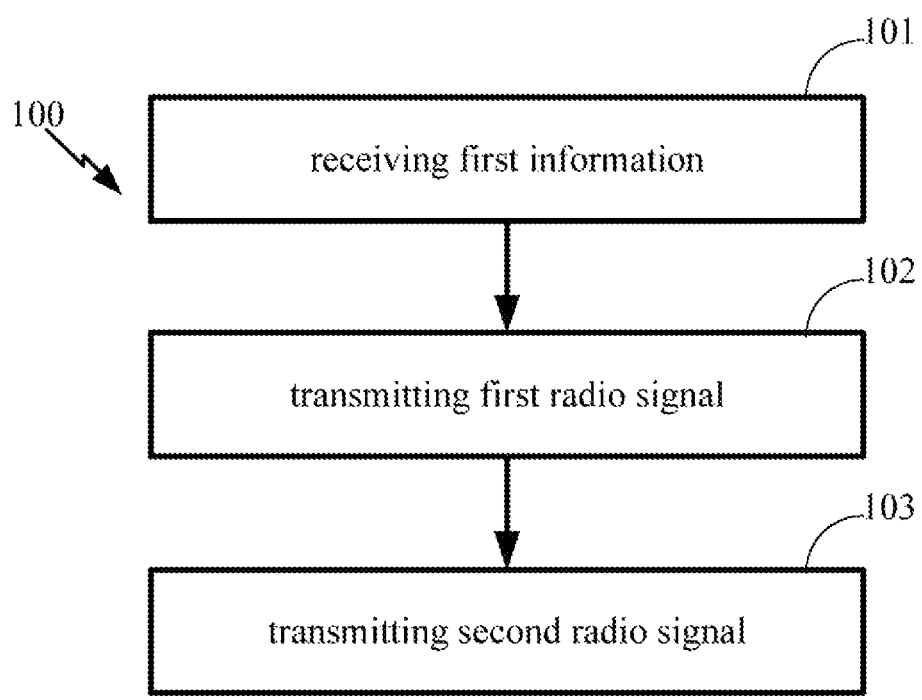
FIG. 1 illustrates a flowchart of transmission of first information, a first radio signal and a second radio signal according to one embodiment of the present disclosure.

Embodiment 1 illustrates a flowchart of transmission of first information, a first radio signal and a second radio signal, as shown in FIG. 1. In FIG. 1, each box represents a step. In Embodiment 1, the UE of the present disclosure receives first information in step S101; transmits a first radio signal in step S102; and transmits a second radio signal in step S103; wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; the first configuration information is one of the P1 piece(s) of configuration information; a time-frequency resource occupied by the second radio signal is related to at least one of the time-frequency resource occupied by the first radio signal or the first sequence.

In one embodiment, the first type resource comprises time-frequency resource.

In one embodiment, the first type resource comprises a positive integer number of PRB(s).

In one embodiment, a subcarrier spacing of a subcarrier occupied by the first type resource in frequency domain within a given time is no greater than 180 kHz, the first type resource comprises multiple milliseconds.

In one embodiment, the first type resource comprises a positive integer number of RE(s). The RE(s) occupies(occupy) a subcarrier in frequency domain and a multicarrier symbol in time domain.

In one embodiment, the multicarrier symbol is an OFDM symbol.

In one embodiment, the multicarrier symbol is an FBMC symbol.

In one embodiment, the multicarrier symbol is an SC-FDMA symbol.

In one embodiment, an RE occupied by the first radio signal is an RE occupied by the first type resource determined by the first configuration information.

In one embodiment, the first-type set consists of one element.

In one embodiment, the first-type set consists of multiple elements, wherein any two elements in the first-type set are unequal.

In one embodiment, the P1 is greater than 1, the first-type integer indicated by one of any two of the P1 pieces of configuration information is different from the first-type integer indicated by the other of the any two of the P1 pieces of configuration information.

In one embodiment, the P1 is greater than 1, there exist two pieces of the configuration information in the P1 pieces of configuration information that indicate the first-type sets with different numbers of elements.

In one embodiment, the P1 is greater than 1, there exist two pieces of configuration information out of the P1 pieces of configuration information that indicate the first-type sets with (a) shared element(s) (namely, the intersection of the two first-type sets is not an empty set).

In one embodiment, the P1 is greater than 1, the intersection of the first-type sets indicated by any two pieces of the configuration in the P1 pieces of configuration is an empty set.

In one embodiment, a channel quality between the UE and a receiver of the first radio signal is used to determine the first configuration information out of the P1 pieces of configuration information.

In one embodiment, the channel quality includes RSRP.

In one embodiment, the channel quality includes RSRQ.

In one embodiment, the first sequence is a pseudo random sequence.

In one embodiment, the first sequence is a Zadoff-Chu sequence.

In one embodiment, the first sequence comprises CP.

In one embodiment, all elements in the first sequence are the same.

In one embodiment, all elements in the first sequence are 1.

In one embodiment, the target set is composed of one element (i.e., the M2).

In one embodiment, the target set is composed of multiple elements.

In one embodiment, a receiver of the second radio signal determines the M2 out of the target set through blind detection.

In one embodiment, the first sequence is used to determine an index of the M2 in the target set.

In one embodiment, an index of the first sequence in a candidate sequence set is used to determine the M2 out of the target set, the candidate sequence set comprises multiple candidate sequences.

In one embodiment, the length of the candidate sequence is related to a number of REs occupied by the first radio signal.

In one embodiment, all of the candidate sequences in the candidate sequence set are of the same length (i.e., a number of elements).

In one embodiment, the first bit block is transmitted from a higher layer of the UE to a physical layer of the UE.

In one embodiment, the higher layer is a Media Access Control (MAC) layer.

In one embodiment, the higher layer is a Radio Link Control (RLC) layer.

In one embodiment, the M1 is a positive integer number power of 2 or is 1.

In one embodiment, the M2 is a positive integer number power of 2 or is 1.

In one embodiment, the first bit block is a TB.

In one embodiment, the first bit block is transmitted on a UL-SCH.

In one embodiment, the second radio signal is transmitted on a PUSCH.

In one embodiment, the second radio signal is an output after the first bit block is sequentially subjected to Channel Coding, a Modulation Mapper, a Layer Mapper, Precoding, a Resource Element Mapper and OFDM symbol Generation.

In one sub-embodiment of the above embodiment, the channel coding comprises rate matching.

In one embodiment, transmission of the first radio signal is Grant-Free.

In one embodiment, transmission of the first radio signal is Contention-Based.

In one embodiment, the first information is dynamically configured.

In one embodiment, the first information is semi-statically configured.

In one embodiment, the first information is configured by an RRC layer signaling.

In one embodiment, the first information is cell-common.

In one embodiment, the configuration information explicitly indicates the first type resource and the first-type set, the first-type integer is implicitly indicated by the first type resource.

In one sub-embodiment of the above embodiment, the first-type integer is related to a number of REs comprised in the first type resource.

In one embodiment, the configuration information explicitly indicates the first type resource, the first-type integer and the first-type set.

In one embodiment, time domain resources occupied by any two of the M1 first radio sub-signals are orthogonal (i.e., non-overlapping), time domain resources occupied by any two of the M2 second radio sub-signals are orthogonal (i.e., non-overlapping).

In one embodiment, a length of the first sequence is configured by a downlink higher-layer signaling.

In one embodiment, for a given time, the first type resource occupies at most one subcarrier in frequency domain.

In one embodiment, P1 of the first type resource(s) is(are) respectively indicated by the P1 piece(s) of configuration information, the P1 first type resource(s) occupies(occupy) an equal number of subcarriers occupied by one multicarrier symbol.

In one embodiment, the first sequence is a Preamble.

In one embodiment, a transmission channel for the first radio signal is a RACH.

In one embodiment, the first radio signal is transmitted on an NPRACH.

In one embodiment, the second radio signal is transmitted on an NPUSCH.

In one embodiment, all second radio sub-signals of the M2 second radio sub-signals have the same RV.

In one embodiment, there exist two second radio sub-signals in the M1 second radio sub-signals that have different RVs.

In one embodiment, the RV of each second radio sub-signal in the M2 second radio sub-signals is related to the M2.

Embodiment 2

Figure 2:
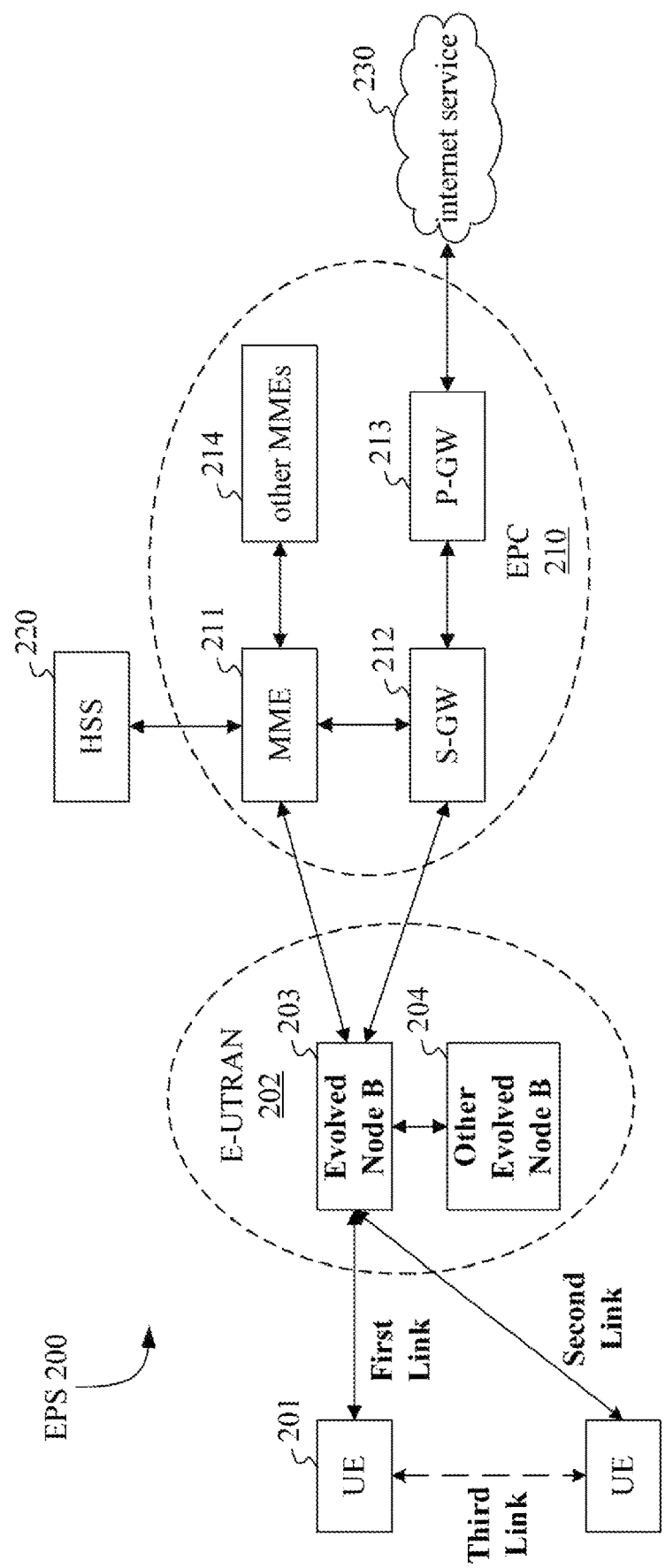
FIG. 2 illustrates a schematic diagram of a network architecture according to one embodiment of the present disclosure.

Embodiment 2 illustrates a schematic diagram of a network architecture, as shown in FIG. 2. FIG. 2 is a diagram illustrating a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may comprise one or more UEs 201, an E-UTRAN 202, an Evolved Packet Core (EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN 202 comprises an evolved node B (eNB) 203 and other eNBs 204. The eNB 203 provides UE 201 oriented user plane and control plane protocol terminations. The eNB 203 may be connected to other eNBs 204 via an X2 interface (for example, backhaul). The eNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The eNB 203 provides an access point of the EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The eNB 203 is connected to the EPC 210 via an S1 interface. The EPC 210 comprises an MME 211, other MMES 214, a Service Gateway (S-GW) 212 and a Packet Date Network Gateway (P-GW) 213. The MME 211 is a control node for processing a signaling between the UE 201 and the EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services. (PSS)

In one embodiment, the UE 201 corresponds to the UE in the present disclosure.

In one embodiment, the eNB 203 corresponds to the base station in the present disclosure.

In one embodiment, the UE 201 supports Grant-Free uplink transmission.

In one embodiment, the eNB 203 supports Grant-Free uplink transmission.

Embodiment 3

Figure 3:
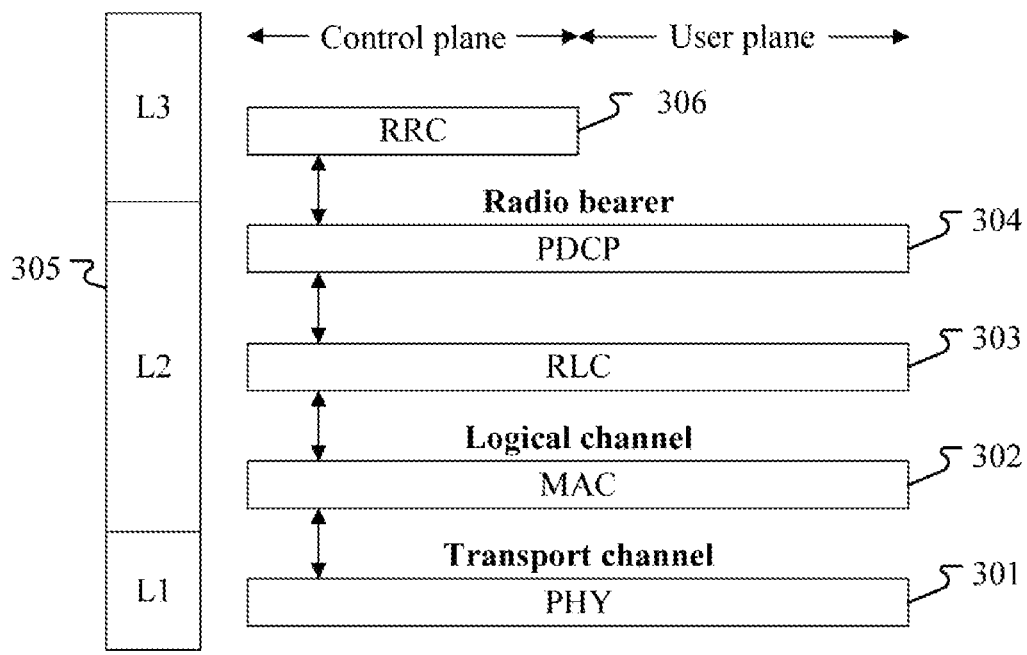
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the eNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource block) in a cell. The MAC sublayer 302 is also in charge of HARQ operation. In the control plane, the radio protocol architecture of the UE and the eNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the eNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the RRC sublayer 306.

In one embodiment, the first information in the present disclosure is generated by the PHY 301.

In one embodiment, the first information in the present disclosure is generated by the MAC sublayer 302.

In one embodiment, the second information in the present disclosure is generated by the RRC sublayer 306.

In one embodiment, the second information in the present disclosure is generated by the PHY 301.

In one embodiment, the second information in the present disclosure is generated by the MAC sublayer 302.

In one embodiment, the first radio signal in the present disclosure is generated by the PHY 301.

In one embodiment, the first radio signal in the present disclosure is generated by the MAC sublayer 302.

In one embodiment, the second radio signal in the present disclosure is generated by the PHY 301.

In one embodiment, the second radio signal in the present disclosure is generated by the MAC sublayer 302.

In one embodiment, the second radio signal in the present disclosure is generated by the RRC sublayer 306.

In one embodiment, the third radio signal in the present disclosure is generated by the PHY 301.

In one embodiment, the third radio signal in the present disclosure is generated by the MAC sublayer 302.

In one embodiment, the third radio signal in the present disclosure is generated by the RRC sublayer 306.

In one embodiment, the fourth radio signal in the present disclosure is generated by the PHY 301.

Embodiment 4

Figure 4:
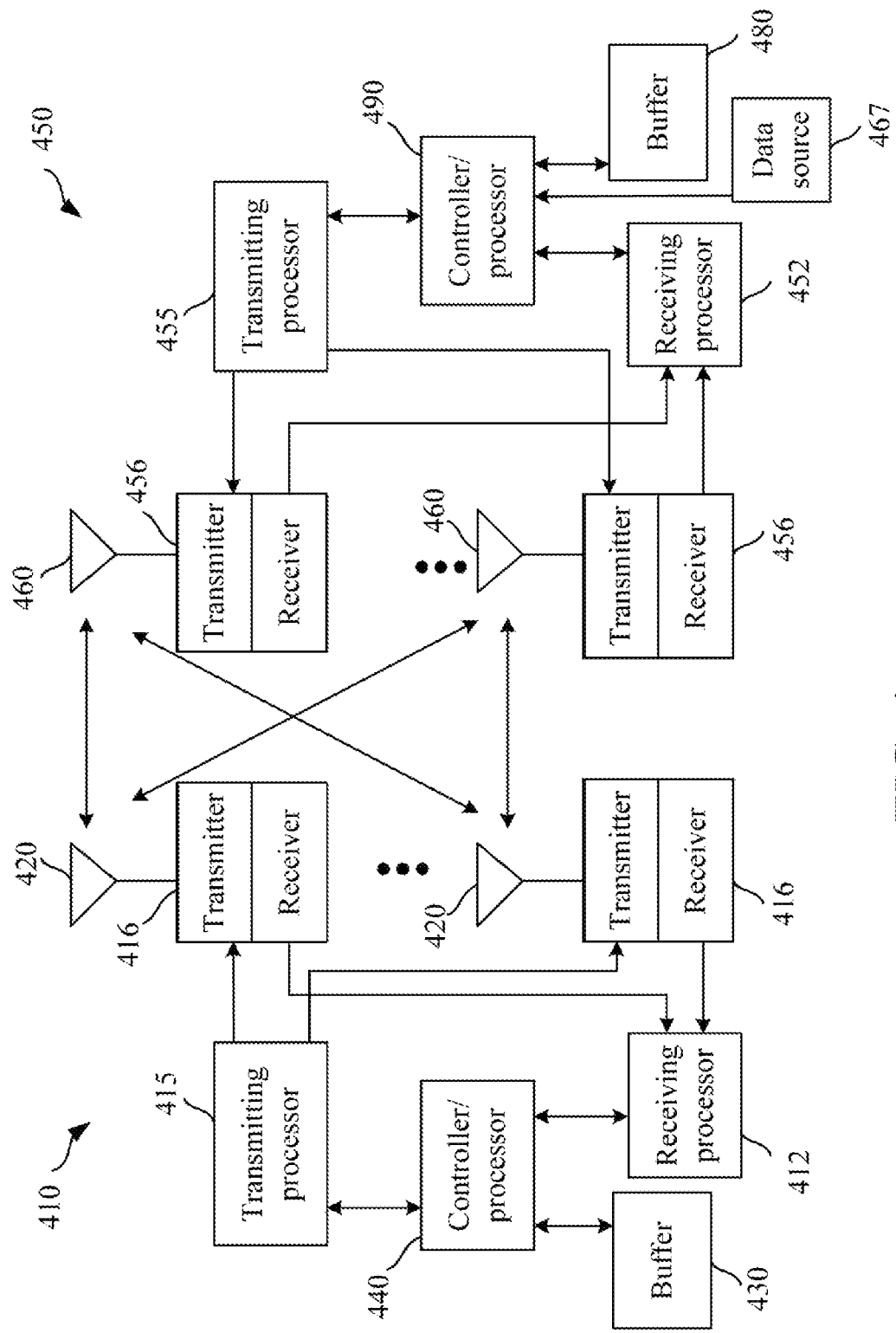
FIG. 4 illustrates a schematic diagram of a base station and a UE according to one embodiment of the present disclosure.

Embodiment 4 illustrates a schematic diagram of a base station and a given UE, as shown in FIG. 4. FIG. 4 is a block diagram illustrating a UE 450 and a gNB 410 that are in communication with each other in access network.

The UE 450 comprises a controller/processor 490, a memory 480, a receiving processor 452, a transmitter/receiver 456, a transmitting processor 455 and a data source 467. The transmitter/receiver 456 comprises an antenna 460. The data source 467 provides a higher layer packet to the controller/processor 490, the controller/processor 490 provides header compression and decompression, encryption and decryption, packet segmentation and reordering as well as a multiplexing and demultiplexing between a logical channel and a transport channel so as to implement the L2 layer protocols used for the user plane and the control plane. The higher layer packet may comprise data or control information, for example, a DL-SCH or a UL-SCH. The transmitting processor 455 performs various signal transmitting processing functions of the L1 layer, including coding, interleaving, scrambling, modulation, power control/allocation, precoding and physical layer control signaling generation. The receiving processor 452 performs various signal receiving processing functions of the L1 layer, including decoding, deinterleaving, descrambling, demodulation, de-precoding and physical layer control signaling extraction. The transmitter 456 is configured to convert a baseband signal provided by the transmitting processor 455 into a radio frequency signal to be transmitted via the antenna 460, and the receiver 456 is configured to convert the radio frequency signal received through the antenna 460 into a baseband signal to be provided to the receiving processor 452.

The base station 410 may comprise a control/processor 440, a memory 430, a transmitting processor 412, a transmitter/receiver 416 and a transmitting processor 415. The transmitter/processor 416 comprises an antenna 420. A higher layer packet is provided to the controller/processor 440, the controller/processor 440 provides header compression and decompression, encryption and decryption, packet segmentation and reordering as well as a multiplexing and demultiplexing between a logical channel and a transport channel so as to implement the L2 layer protocols used for the user plane and the control plane. The higher layer packet may comprise data or control information, for example, a DL-SCH or a UL-SCH. The transmitting processor 415 performs various signal transmitting processing functions of the L1 layer, including coding, interleaving, scrambling, modulation, power control/allocation, precoding and physical layer control signaling (such as a PBCH, a PDCCH, a reference signal, etc.) generation. The receiving processor 412 performs various signal receiving processing functions of the L1 layer, including decoding, deinterleaving, descrambling, demodulation, de-precoding and physical layer control signaling extraction. The receiver 416 is configured to convert a baseband signal provided by the transmitting processor 415 into a radio frequency signal to be transmitted via the antenna 420, and the receiver 416 is configured to convert the radio frequency signal received through the antenna 420 into a baseband signal to be provided to the receiving processor 412.

In downlink (DL) transmission, a higher layer packet DL-SCH comprising the first information, the second information and the third information of the present disclosure is provided to the controller/processor 440. The controller/processor 440 implements functions of the L2 layer. In DL transmission, the controller/processor 440 provides header compression, encryption, packet segmentation and reordering and multiplexing between a logical channel and a transport channel, as well as radio resource allocation for the UE 450 based on various priorities. The controller/processor 440 is also in charge of HARQ operation, retransmission of a lost packet, and a signaling to the UE 450. The transmitting processor 415 performs signal processing functions used for the L1 layer (that is, PHY). A fourth radio signal and a physical layer signal consisting of first information, second information and a third radio signal in the present disclosure are generated by the transmitting processor 415. The signal processing functions include decoding and interleaving, so as to ensure an Forward Error Correction (FEC) at the UE 450 side and modulating baseband signals according to each modulation scheme (e.g., BPSK, QPSK). The modulated signals are divided into parallel streams. Each of the parallel streams is mapped to corresponding multicarrier subcarriers and/or multicarrier symbols, which are then mapped by the transmitting processor 415 to the antenna 420 via the transmitter 416 and transmitted in the form of radio frequency signals. At the receiver side, each receiver 456 receives a radio frequency signal via a corresponding antenna 460. Each receiver 456 recovers baseband information modulated to radio frequency carriers and provides the baseband information to the receiving processor 452. The receiving processor 452 performs signal receiving processing functions of the L1 layer. The signal receiving processing functions include a measurement on the fourth radio signal in the present disclosure and reception of the physical layer signal carrying the first information, the second information and the third radio signal in the present disclosure. Multicarrier symbols in multicarrier symbol streams are used for modulation based on various modulation schemes (e.g., BPSK, QPSK, etc.), after that the modulated symbols are subjected to decoding and deinterleaving to recover data and control signals transmitted by the eNB 410 on a physical channel. The data and control signals are then provided to the controller/processor 490. The controller/processor 490 implements functions of the L2 layer. The controller/processor 490 can be connected to the memory 480 that stores program codes and data. The memory 480 may be called a computer readable medium.

In uplink (UL) transmission, the data source 467 is configured to provide signal-relevant configuration data to the controller/processor 490. The data source 467 represents all protocol layers above the L2 layer, the second radio signal in the present disclosure is generated in the data source 467. The controller/processor 490 provides header compression, encryption, packet segmentation and reordering, and multiplexing between a logical channel and a transport channel based on the configuration allocation of the eNB 410 so as to implement the L2 layer protocols used for the user plane and the control plane. The controller/processor 490 is also responsible for HARQ operation, retransmission of a lost packet, and a signaling to the eNB 410. The transmitting processor 455 performs signal transmitting processing functions of the L1 layer. The signal transmitting processing functions include coding, modulation, etc. The modulated signals are divided into parallel streams. Each of the parallel streams is mapped to corresponding multicarrier subcarriers and/or multicarrier symbols to generate baseband signals, which are then mapped by the transmitting processor 455 to the antenna 460 via the transmitter 456 and transmitted in the form of radio frequency signals. Physical layer signals (including generation and transmission of the first radio signal in the present disclosure and processing of the second radio signal on a physical layer) are generated by the transmitting processor 455. The receiver 416 receives a radio frequency signal via a corresponding antenna 420. Each receiver 416 recovers baseband information modulated to radio frequency carriers and provides the baseband information to the receiving processor 412. The receiving processor 412 performs signal receiving processing functions of the L1 layer (i.e., PHY), including reception of the first radio signal in the present disclosure and reception of the second radio signal on a physical layer. The signal receiving processing functions include acquiring multicarrier symbol streams, and then modulating multicarrier symbols in the multicarrier symbol streams in accordance with modulation schemes, and decoding so as to recover original data and/or control signal transmitted by the UE 450 on a physical channel. The data and/or control signal are later provided to the controller/processor 440. The controller/processor 440 implements functions of the L2 layer. The controller/processor 440 can be connected to the memory 430 that stores program codes and data. The memory 430 may be called a computer readable medium.

In one embodiment, the UE 450 comprises at least one processor and at least one memory. The at least one memory comprises computer program codes. The at least one memory and the computer program codes are configured to be used in collaboration with the at least one processor. The UE 450 at least receives first information; transmits a first radio signal; and transmits a second radio signal; wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; a time-frequency resource occupied by the second radio signal is related to at least one of the time-frequency resource occupied by the first radio signal or the first sequence.

In one embodiment, the UE 450 comprises a memory that stores a computer readable instruction program. The computer readable instruction program generates an action when executed by at least one processor. The action includes: receiving first information; transmitting a first radio signal; and transmitting a second radio signal; wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; a time-frequency resource occupied by the second radio signal is related to at least one of the time-frequency resource occupied by the first radio signal or the first sequence.

In one embodiment, the eNB 410 comprises at least one processor and at least one memory. The at least one memory includes computer program codes. The at least one memory and the computer program codes are configured to be used in collaboration with the at least one processor. The eNB 410 at least transmits first information; receives a first radio signal; and receives a second radio signal; wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; a time-frequency resource occupied by the second radio signal is related to at least one of the time-frequency resource occupied by the first radio signal or the first sequence.

In one embodiment, the eNB 410 comprises a memory that stores a computer readable instruction program. The computer readable instruction program generates an action when executed by at least one processor. The action includes: transmitting first information; receiving a first radio signal; and receiving a second radio signal; wherein the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; a time-frequency resource occupied by the second radio signal is related to at least one of the time-frequency resource occupied by the first radio signal or the first sequence.

In one embodiment, the UE 450 corresponds to the UE in the present disclosure.

In one embodiment, the eNB 410 corresponds to the base station in the present disclosure.

In one embodiment, the receiver 456 (including the antenna 460), the receiving processor 452 and the controller/processor 490 are used to receive the first information in the present disclosure.

In one embodiment, the receiver 456 (including the antenna 460), the receiving processor 452 and the controller/processor 490 are used to receive the second information in the present disclosure.

In one embodiment, the transmitter 456 (including the antenna 460) and the transmitting processor 455 are used to transmit the first radio signal in the present disclosure.

In one embodiment, the transmitter 456 (including the antenna 460), the transmitting processor 455 and the controller/processor 490 are used to transmit the second radio signal in the present disclosure.

In one embodiment, the receiver 456 (including the antenna 460), the receiving processor 452 and the controller/processor 490 are used to receive the third radio signal in the present disclosure.

In one embodiment, the receiver 456 (including the antenna 460), the receiving processor 452 and the controller/processor 490 are used to receive the fourth radio signal in the present disclosure.

In one embodiment, the transmitter 416 (including the antenna 420), the transmitting processor 415 and the controller/processor 440 are used to transmit the first information in the present disclosure.

In one embodiment, the transmitter 416 (including the antenna 420), the transmitting processor 415 and the controller/processor 440 are used to transmit the second information in the present disclosure.

In one embodiment, the receiver 416 (including the antenna 420), the receiving processor 412 and the controller/processor 440 are used to receive the first radio signal in the present disclosure.

In one embodiment, the receiver 416 (including the antenna 420), the receiving processor 412 and the controller/processor 440 are used to receive the second radio signal in the present disclosure.

In one embodiment, the transmitter 416 (including the antenna 420), the transmitting processor 415 and the controller/processor 440 are used to transmit the third radio signal in the present disclosure.

In one embodiment, the transmitter 416 (including the antenna 420), the transmitting processor 415 and the controller/processor 440 are used to transmit the fourth radio signal in the present disclosure.

Embodiment 5

Figure 5:
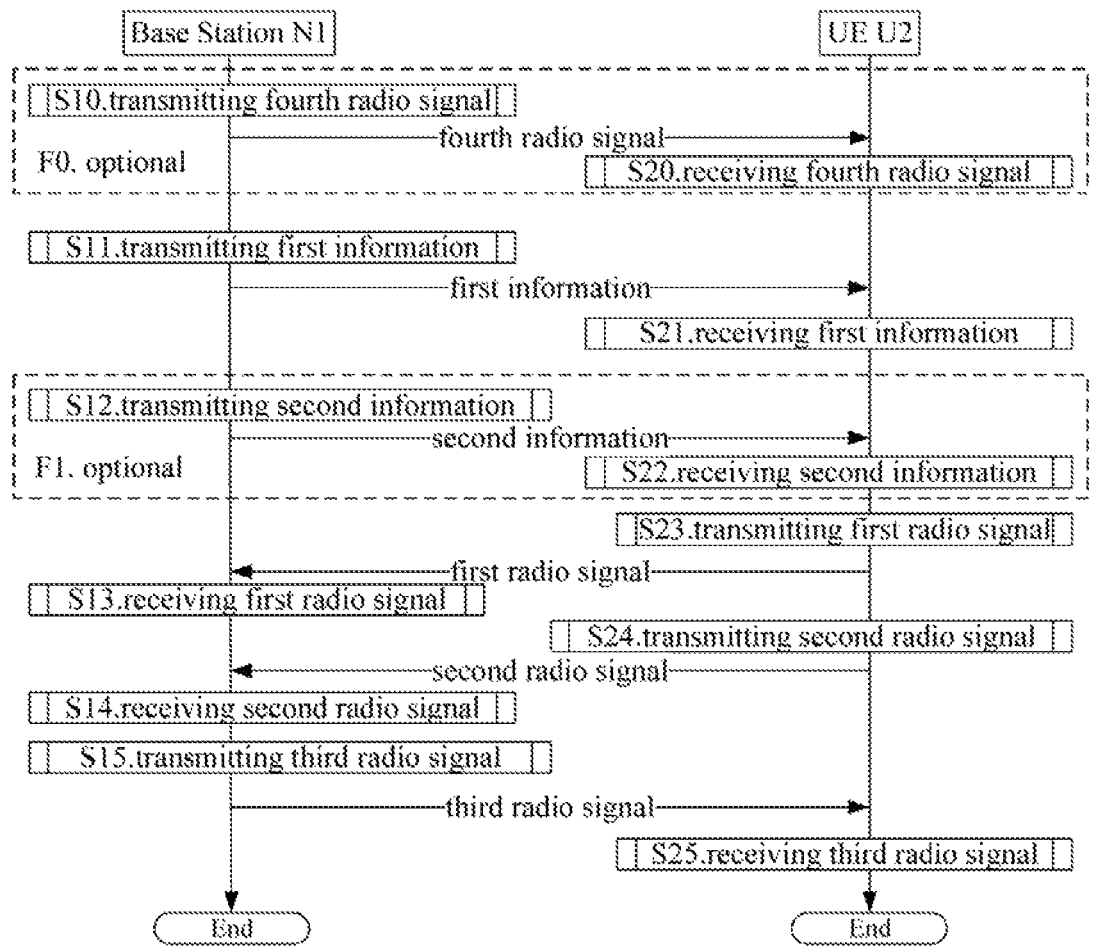
FIG. 5 illustrates a flowchart of radio signal transmission according to one embodiment of the present disclosure.

Embodiment 5 illustrates a flowchart of radio signal transmission, as shown in FIG. 5. In FIG. 5, a base station N1 is a maintenance base station for a serving cell of a UE U2. Steps in box F0 and box F1 are optional, respectively.

The base station N1 transmits a fourth radio signal in step S10, transmits first information in step S11, transmits second information in step S12, receives a first radio signal in step S13, receives a second radio signal in step S14, and transmits a third radio signal in step S15.

The UE U2 receives a fourth radio signal in step S20, receives first information in step S21, receives second information in step S22, transmits a first radio signal in step S23, transmits a second radio signal in step S24, and receives a third radio signal in step S25.

In Embodiment 5, the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; a time-frequency resource occupied by the second radio signal is related to at least one of the time-frequency resource occupied by the first radio signal or the first sequence. The third radio signal is used for at least one of determining whether the first bit block needs to be retransmitted, adjusting transmission timing for the UE, allocating resources of an uplink transmission for the UE, or configuring a subcarrier spacing of an uplink transmission for the UE; the second information is used to determine P2 second-type resources; a measurement on the fourth radio signal is used to determine at least one of the time-frequency resources occupied by the first radio signal, or the radio resources occupied by the second radio signal.

In one embodiment, M3 is used to determine at least one of a start time for a transmission of the third radio signal or time domain resources occupied by the third radio signal, the M3 is an element within the target set.

In one embodiment, radio resources occupied by the second radio signal belong to one of the P2 second-type resources, the P2 is a positive integer; at least one of a number of subcarriers, a subcarrier spacing, an MCS, or an RV corresponding to the second radio signal is related to the second-type resources where the second radio signal belongs; radio resources comprise at least the former of time-frequency resources and code-domain resources.

In one embodiment, M3 is used to determine at least one of a start time for a transmission of the third radio signal or time domain resources occupied by the third radio signal, the M3 is an element within the target set; a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms; a reference time length is greater than or equal to a first threshold and the target time length is equal to the first alternative time length, or, the reference time length is less than the first threshold and the target time length is equal to the second alternative time length; the reference time length is related to at least the first one of the M3, a number of RUs occupied by the second radio sub-signal, or a subcarrier spacing of RUs occupied by the second radio sub-signal. The first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

In one embodiment, the first-type set consists of one element.

In one embodiment, the first-type set consists of multiple elements, wherein any two elements in the first-type set are unequal.

In one embodiment, the P1 is greater than 1, the first-type integer indicated by one of any two of the P1 pieces of configuration information is different from the first-type integer indicated by the other of the any two of the P1 pieces of configuration information.

In one embodiment, the P1 is greater than 1, there exist two pieces of the configuration information in the P1 pieces of configuration information that indicate the first-type sets with different numbers of elements.

In one embodiment, the P1 is greater than 1, there exist two pieces of the configuration information in the P1 pieces of configuration information that indicate the first-type sets with (a) shared element(s) (namely, the intersection of the two first-type sets is not an empty set).

In one embodiment, the P1 is greater than 1, the intersection of the first-type sets indicated by any two pieces of the configuration in the P1 pieces of configuration is an empty set.

In one embodiment, a channel quality between the UE and a receiver of the first radio signal is used to determine the first configuration information out of the P1 pieces of configuration information.

In one embodiment, the first information is dynamically configured.

In one embodiment, the first information is semi-statically configured.

In one embodiment, the first information is configured by an RRC layer signaling.

In one embodiment, the first information is cell-common.

In one embodiment, the first information is TRP-specific.

In one embodiment, the first information is configured by a System Information Block (SIB).

In one embodiment, the second information is semi-statically configured.

In one embodiment, the second information is carried by an RRC layer signaling.

In one embodiment, the second information is cell-common.

In one embodiment, the second information is TRP-specific.

In one embodiment, the second information is configured by an SIB.

In one embodiment, the fourth radio signal includes at least one of a PSS or an SSS.

In one embodiment, the fourth radio signal includes at least one of an NPSS or an NSSS.

In one embodiment, the fourth radio signal includes a CRS.

In one embodiment, the fourth radio signal includes an NRS.

In one embodiment, the fourth radio signal includes a CSI-RS.

Embodiment 6

Figure 6:
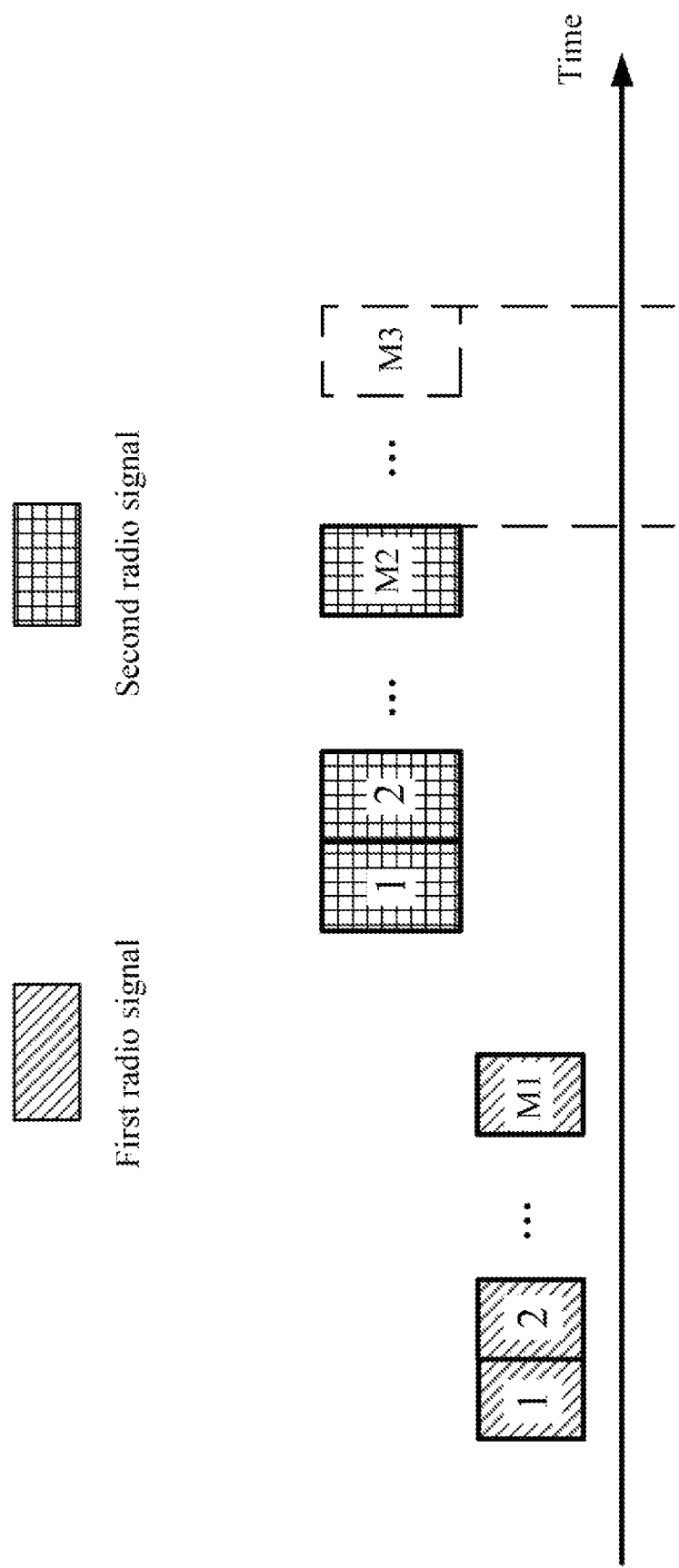
FIG. 6 illustrates a schematic diagram illustrating a relationship between a first radio signal and a second radio signal according to one embodiment of the present disclosure.

Embodiment 6 illustrates a schematic diagram illustrating a relationship between a first radio signal and a second radio signal, as shown in FIG. 6. In FIG. 6, the horizontal axis represents time, the rectangle filled with slashes represents a first radio signal, and a rectangle filled with cross lines represents a second radio signal.

In Embodiment 6, the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set; a time-frequency resource occupied by the second radio signal is related to at least one of the time-frequency resource occupied by the first radio signal or the first sequence.

In one embodiment, the first sequence is a pseudo random sequence.

In one embodiment, the first sequence is a Zadoff-Chu sequence.

In one embodiment, the first sequence comprises CP.

In one embodiment, all elements in the first sequence are the same.

In one embodiment, all elements in the first sequence are 1.

In one embodiment, the first radio signal is transmitted on a PRACH.

In one embodiment, the target set is composed of one element (i.e., the M2).

In one embodiment, the target set is composed of multiple elements.

In one embodiment, the first sequence is used to determine an index of the M2 in the target set.

In one embodiment, an index of the first sequence in a candidate sequence set is used to determine the M2 out of the target set, the candidate sequence set comprises multiple candidate sequences.

In one embodiment, the first bit block is transmitted from a higher layer of the UE to a physical layer of the UE.

In one embodiment, the M1 is a positive integer number power of 2 or is 1.

In one embodiment, the M2 is a positive integer number power of 2 or is 1.

In one embodiment, the first bit block is a Transmission Block (TB), or the first bit block is a part of a TB.

In one embodiment, the first bit block is transmitted on a UL-SCH.

In one embodiment, the second radio signal is transmitted on a PUSCH.

In one embodiment, the second radio signal is an output after the first bit block is sequentially subjected to Channel Coding, a Modulation Mapper, a Layer Mapper, Precoding, a Resource Element Mapper and OFDM symbol Generation.

In one sub-embodiment of the above embodiment, the channel coding comprises rate matching.

In one embodiment, transmission of the first radio signal is Grant-Free.

In one embodiment, transmission of the first radio signal is Contention-Based.

In one embodiment, time domain resources occupied by any two of the M1 first radio sub-signals are orthogonal (i.e., non-overlapping), time domain resources occupied by any two of the M2 second radio sub-signals are orthogonal (i.e., non-overlapping).

In one embodiment, the first sequence is a Preamble.

In one embodiment, a transmission channel for the first radio signal is a RACH.

In one embodiment, the first radio signal is transmitted on an NPRACH.

In one embodiment, the second radio signal is transmitted on an NPUSCH.

In one embodiment, all second radio sub-signals of the M2 second radio sub-signals have the same RV.

In one embodiment, there exist two second radio sub-signals in the M1 second radio sub-signals that have different RVs.

In one embodiment, the RV of each second radio sub-signal in the M2 second radio sub-signals is related to the M2.

Embodiment 7

Figure 7:
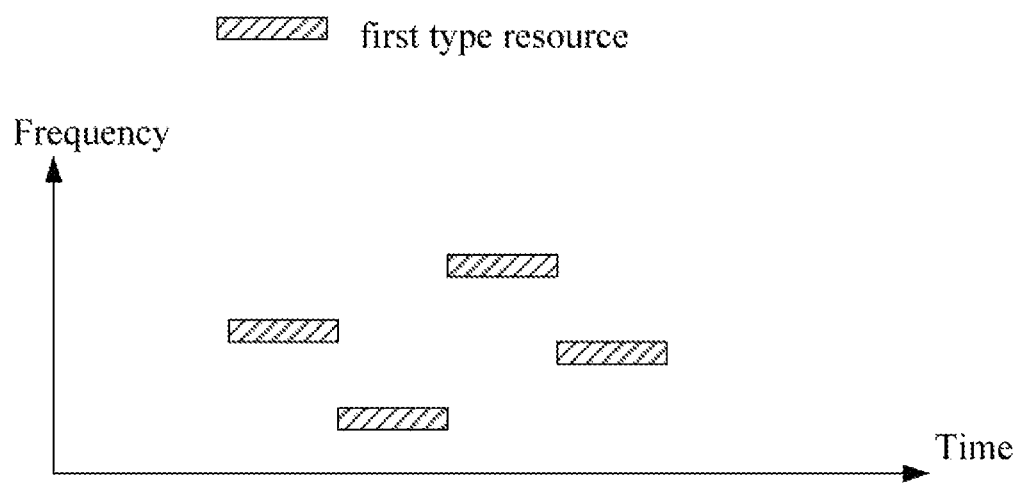
FIG. 7 illustrates a schematic diagram of first-type resources according to one embodiment of the present disclosure.

Embodiment 7 illustrates a schematic diagram of first-type resources, as shown in FIG. 7. In FIG. 7, a box filled with slashes represents a time-frequency resource of the first type resource. In Embodiment 7, a time-frequency resource occupied by a first radio signal belongs to the first type resource determined by first configuration information.

In one embodiment, the first type resource comprises time-frequency resource.

In one embodiment, a subcarrier spacing of a subcarrier occupied by the first type resource in frequency domain within a given time is no greater than 180 kHz, the first type resource comprises multiple milliseconds.

In one embodiment, the first type resource comprises a positive integer number of RE(s). The RE(s) occupies(occupy) a subcarrier in frequency domain and a multicarrier symbol in time domain.

In one embodiment, the multicarrier symbol is an SC-FDMA symbol.

In one embodiment, an RE occupied by the first radio signal is an RE occupied by the first type resource determined by the first configuration information.

In one embodiment, a subcarrier spacing of subcarriers in the first type resource is equal to 3.75 kHz.

In one embodiment, a subcarrier spacing of subcarriers in the first type resource is equal to 1.25 kHz.

Embodiment 8

Figure 8:
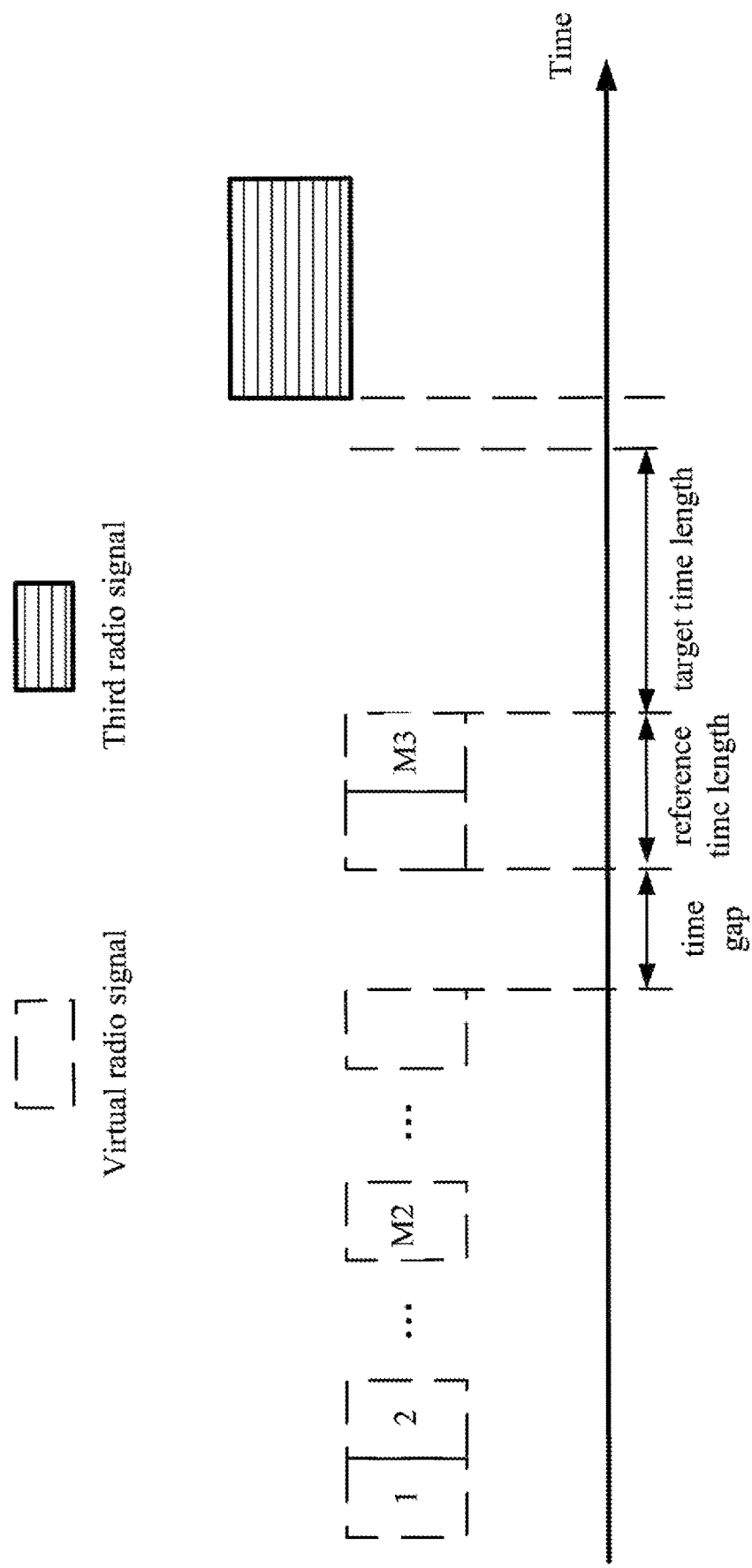
FIG. 8 illustrates a schematic diagram illustrating a relationship between a virtual radio signal and a third radio signal according to one embodiment of the present disclosure.

Embodiment 8 illustrates a schematic diagram illustrating a relationship between a virtual radio signal and a third radio signal according to one embodiment of the present disclosure, as shown in FIG. 8. In FIG. 8, the horizontal axis represents time, a rectangular framed with dotted lines represents the virtual radio signal, and a rectangular filled with vertical lines represents the third radio signal.

In Embodiment 8, the virtual radio signal comprises M3 second radio signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms; a reference time length is greater than or equal to a first threshold and the target time length is equal to the first alternative time length, or, the reference time length is less than the first threshold and the target time length is equal to the second alternative time length; the reference time length is related to at least the first one of the M3, a number of RUs occupied by the second radio sub-signal, or a subcarrier spacing of RUs occupied by the second radio sub-signal. The first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

In one embodiment, the first alternative time length is equal to 40 ms.

In one embodiment, the second alternative time length is equal to 3 ms.

In one embodiment, the second alternative time length is equal to 2 ms.

In one embodiment, the first alternative time length is equal to 40 subframes.

In one embodiment, the second alternative time length is equal to 3 subframes.

In one embodiment, the second alternative time length is equal to 2 subframes.

In one embodiment, the first alternative time length is pre-defined.

In one embodiment, the second alternative time length is pre-defined.

In one embodiment, the target time length does not comprise a Guard Time (GT) between the end time for reception of the second radio signal and the boundary of a subframe.

In one embodiment, the first threshold is equal to 256 ms.

In one embodiment, the reference time length is a time length corresponding to X consecutive subframes in time domain. An end subframe in the X subframes is an end subframe of the virtual radio signal, the virtual radio signal comprises M3 of the second radio sub-signal(s). The virtual radio signal occupies each subframe of the X subframes in time domain, a subframe before the X subframes in time domain is outside the subframes occupied by the virtual radio signal.

In one embodiment, the reference time length is a time length corresponding to Y consecutive slots in time domain. An end slot in the Y slots is an end slot of the virtual radio signal, the virtual radio signal comprises M3 of the second radio sub-signal(s). The virtual radio signal occupies each slot of the Y slots, a slot before the Y slots in time domain is outside the slots occupied by the virtual radio signal.

In one embodiment, the reference time length comprises the reference time length comprises time of deferred transmission for the avoidance of collision with a possible Physical Random Access Channel.

In one embodiment, the reference time length comprises time of deferred transmission for the avoidance of collision with a possible Narrow band Physical Random Access Channel (NPRACH).

In one embodiment, the number of RUs in the second radio sub-signal(s) is equal to one of 1, 2, 3, 4, 5, 6, 8 and 10.

In one embodiment, the subcarrier spacing of RUs occupied by the second radio sub-signal is one of 3.75 kHz and 15 kHz.

Embodiment 9

Figure 9:
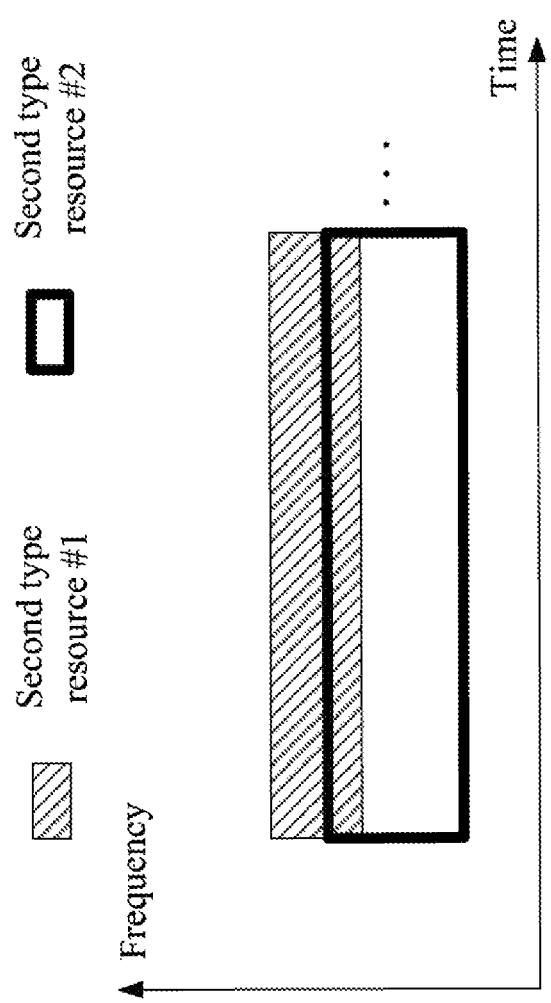
FIG. 9 illustrates a schematic diagram of second-type resources according to one embodiment of the present disclosure.

Embodiment 9 illustrates a schematic diagram of second-type resources according to one embodiment of the present disclosure, as shown in FIG. 9. In FIG. 9, a box filled with slashes and a box marked with thick lines respectively represent a second-type resource #1 and a second resource #2. The second-type resource #1 and the second-type resource #2 are two of the P2 second-type resources in the present disclosure. There is a subcarrier shared between the second-type resource #1 and the second-type resource #2.

In Embodiment 9, radio resources occupied by a second radio signal belong to one of the second-type resources, the P2 is a positive integer; at least one of a number of subcarriers, a subcarrier spacing, an MCS, or an RV corresponding to the second radio signal is related to the second-type resources where the second radio signal belongs; the radio resources comprise at least the former of time-frequency resources and code-domain resources.

In one embodiment, numbers of subcarriers occupied by radio signals transmitted in the P2 second-type resources respectively correspond to P2 positive integers.

In one embodiment, the subcarriers occupied by the second radio signal are consecutive in frequency domain.

In one embodiment, the Modulation Coding Scheme (MCS) supports at least one of QPSK, pi/2 BPSK, pi/4 QPSK, 16QAM or 64QAM.

In one embodiment, the MCS supports Turbo coding.

In one embodiment, the second radio signal supports two RVs.

In one embodiment, the second radio signal supports four RVs.

In one embodiment, the second-type resource #1 and the second-type resource #2 belong to a same Resource Block (RB). The RB consists of 12 consecutive subcarriers.

Embodiment 10

Figure 10:
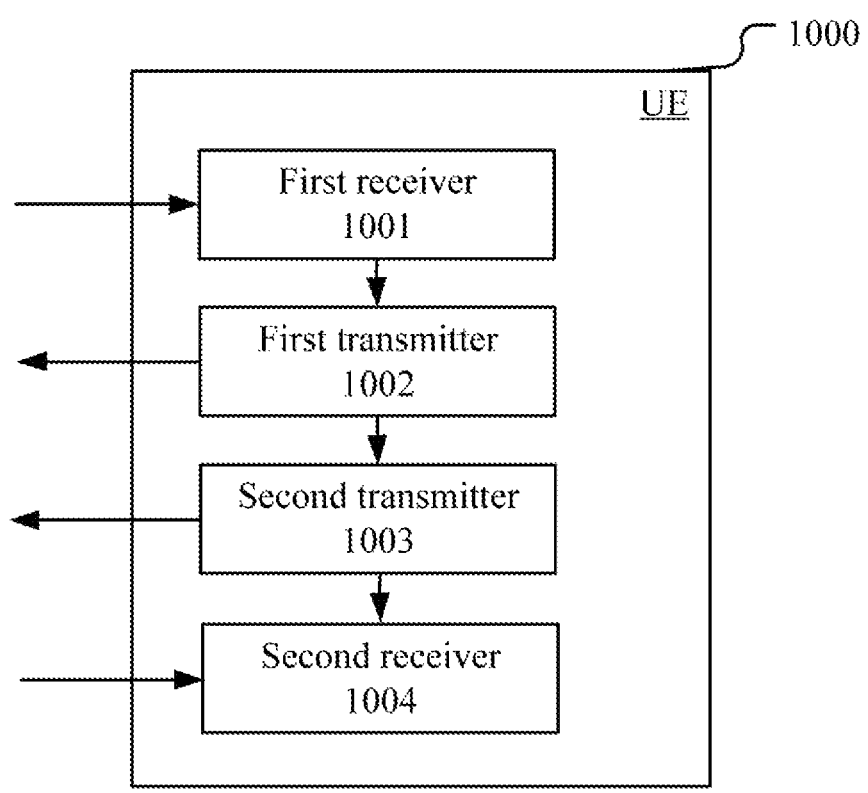
FIG. 10 illustrates a structure block diagram of a processing device in a UE according to one embodiment of the present disclosure.

Embodiment 10 illustrates a structure block diagram of a processing device in a UE, as shown in FIG. 10. In FIG. 10, a UE processing device 1000 comprises a first receiver 1001, a first transmitter 1002, a second transmitter 1003 and a second receiver 1004. The first receiver 1001 comprises a transmitter/receiver 456 (including an antenna 460), a receiving processor 452 and a controller/processor 490 in FIG. 4 of the present disclosure; the first transmitter 1002 comprises a transmitter/receiver 456 (including an antenna 460) and a transmitting processor 455 in FIG. 4 of the present disclosure; the second transmitter 1003 comprises a transmitter/receiver 456 (including an antenna 460), a transmitting processor 455 and a controller/processor 490 in FIG. 4 of the present disclosure; the second receiver 1004 comprises a transmitter/receiver 456 (including an antenna 460), a receiving processor 452 and a controller/processor 490 in FIG. 4 of the present disclosure.

In Embodiment 10, the first receiver 1001 receives first information; the first receiver 1002 transmits a first radio signal; the second transmitter 1003 transmits a second radio signal; and the second receiver 1004 receives a third radio signal; the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; the first configuration information is one of the P1 piece(s) of configuration information; a time-frequency resource occupied by the second radio signal is related to at least one of the time-frequency resource occupied by the first radio signal or the first sequence. The third radio signal is used for at least one of determining whether the first bit block needs to be retransmitted, adjusting transmission timing for the UE, allocating resources of an uplink transmission for the UE, or configuring a subcarrier spacing of an uplink transmission for the UE; M3 is used to determine at least one of a start time for a transmission of the third radio signal or time domain resources occupied by the third radio signal, the M3 is an element within the target set. The first receiver 1001 further receives second information and a fourth radio signal.

In one embodiment, a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms; a reference time length is greater than or equal to a first threshold and the target time length is equal to the first alternative time length, or, the reference time length is less than the first threshold and the target time length is equal to the second alternative time length; the reference time length is related to at least the first one of the M3, a number of RUs occupied by the second radio sub-signal, or a subcarrier spacing of RUs occupied by the second radio sub-signal. The first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

In one embodiment, the second information is used to determine P2 second-type resources; radio resources occupied by the second radio signal belong to one of the P2 second-type resources, the P2 is a positive integer; at least one of a number of subcarriers, a subcarrier spacing, an MCS, or an RV corresponding to the second radio signal is related to the second-type resources where the second radio signal belongs; —radio resources comprise at least the former of time-frequency resources and code-domain resources.

In one embodiment, a measurement on the fourth radio signal is used to determine at least one of the time-frequency resources occupied by the first radio signal or the radio resources occupied by the second radio signal.

Embodiment 11

Figure 11:
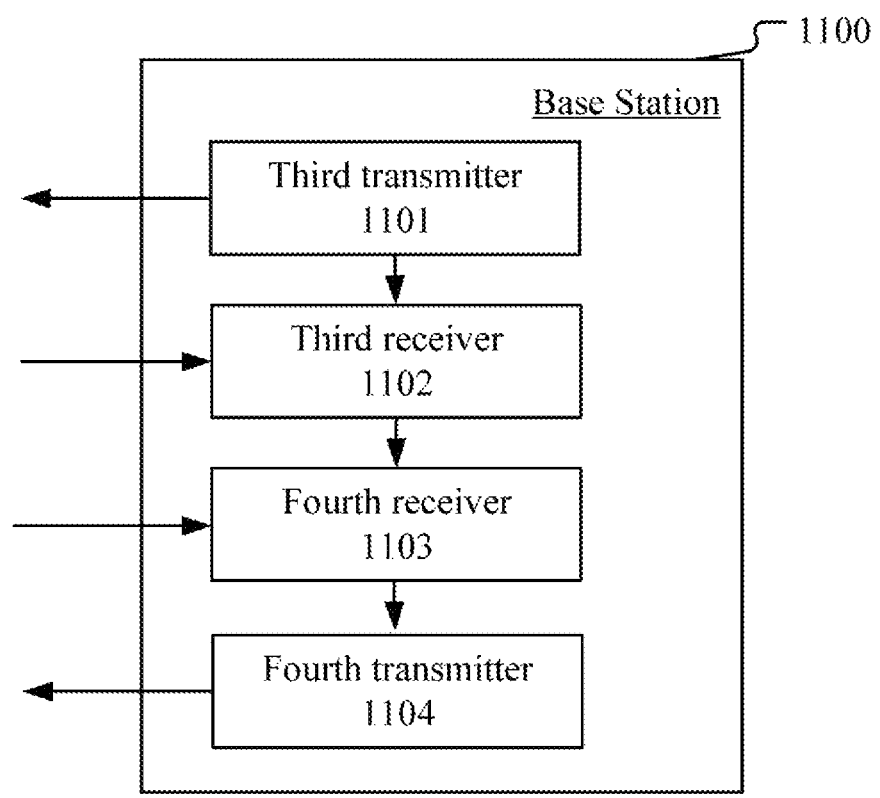
FIG. 11 illustrates a structure block diagram of a processing device in a base station according to one embodiment of the present disclosure.

Embodiment 11 illustrates a structure block diagram of a processing device in a base station, as shown in FIG. 11. In FIG. 11, a base station processing device 1100 comprises a third transmitter 1101, a third receiver 1102, a fourth receiver 1103 and a fourth transmitter 1104. The third transmitter 1101 comprises a transmitter/receiver 416 (including an antenna 420), a transmitting processor 415 and a controller/processor 440 in FIG. 4 of the present disclosure; the third receiver 1102 comprises a transmitter/receiver 416 (including an antenna 420) and a receiving processor 412 in FIG. 4 of the present disclosure; the fourth receiver 1103 comprises a transmitter/receiver 416 (including antenna 420), a receiving processor 412 and a controller/processor 440; the fourth transmitter 1104 comprises a transmitter/receiver 416 (including antenna 420) and a transmitting processor 415 in FIG. 4 of the present disclosure.

In Embodiment 11, the third transmitter 1101 transmits first information; the third receiver 1102 receives a first radio signal; the fourth receiver 1103 receives a second radio signal; the fourth transmitter 1104 transmits a third radio signal; the first information comprises P1 piece(s) of configuration information, each of the P1 piece(s) of configuration information is used to determine first-type resources, a first-type integer, and a first-type set, the P1 is a positive integer; the first radio signal comprises M1 first radio sub-signal(s), a first sequence is used to generate each of the M1 first radio sub-signal(s); the second radio signal comprises M2 second radio sub-signal(s), a first bit block is used to generate each of the M2 second radio sub-signal(s); the M1 is a positive integer, the M2 is an element within a target set. The first-type integer is a positive integer, each element within the first-type set is a positive integer. Time-frequency resources occupied by the first radio signal belong to the first type resource determined by first configuration information, the M1 is the first-type integer determined by the first configuration information, the target set is the first-type set determined by the first configuration information; the first configuration information is one of the P1 piece(s) of configuration information; a time-frequency resource occupied by the second radio signal is related to at least one of the time-frequency resource occupied by the first radio signal or the first sequence. The third radio signal is used for at least one of determining whether the first bit block needs to be retransmitted, adjusting transmission timing for the UE, allocating resources of an uplink transmission for the UE, or configuring a subcarrier spacing of an uplink transmission for the UE; M3 is used to determine at least one of a start time for a transmission of the third radio signal or time domain resources occupied by the third radio signal, the M3 is an element within the target set. The third transmitter 1101 further transmits second information and a fourth radio signal.

In one embodiment, a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms; a reference time length is greater than or equal to a first threshold and the target time length is equal to the first alternative time length, or, the reference time length is less than the first threshold and the target time length is equal to the second alternative time length; the reference time length is related to at least the first one of the M3, a number of RUs occupied by the second radio sub-signal, or a subcarrier spacing of RUs occupied by the second radio sub-signal. The first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

In one embodiment, the second information is used to determine P2 second-type resources; radio resources occupied by the second radio signal belong to one of the P2 second-type resources, the P2 is a positive integer; at least one of a number of subcarriers, a subcarrier spacing, an MCS, or an RV corresponding to the second radio signal is related to the second-type resources where the second radio signal belongs; radio resources comprise at least the former of time-frequency resources and code-domain resources.

In one embodiment, a measurement on the fourth radio signal is used to determine at least one of the time-frequency resources occupied by the first radio signal, or the radio resources occupied by the second radio signal.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to mobile phones, tablet computers, notebooks, network cards, low consumption equipment, enhanced MTC (eMTC) terminals, NB-IOT terminals, vehicle-mounted communication equipment, etc. The base station or network side equipment in the present disclosure includes but is not limited to macro-cellular base stations, micro-cellular base stations, home base stations, relay base station, eNB, gNB, Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
    receiving first information;
    transmitting a first radio signal;
    transmitting a second radio signal; and
    receiving a third radio signal;
    wherein:
        the first information comprises P1 piece(s) of configuration information, each of the P1 piece(s) of configuration information is used to determine first-type resources, a first-type integer, and a first-type set, the P1 is a positive integer;
        the first radio signal comprises M1 first radio sub-signal(s), a first sequence is used to generate each of the M1 first radio sub-signal(s);
        the second radio signal comprises M2 second radio sub-signal(s), a first bit block is used to generate each of the M2 second radio sub-signal(s);
        the M1 is a positive integer, the M2 is an element within a target set;
        the first-type integer is a positive integer, each element within the first-type set is a positive integer;
        time-frequency resources occupied by the first radio signal belong to the first-type resources determined by first configuration information, the M1 is the first-type integer determined by the first configuration information, the target set is the first-type set determined by the first configuration information;
        the first configuration information is one of the P1 piece(s) of configuration information;
        time-frequency resources occupied by the second radio signal is related to at least one of the time-frequency resources occupied by the first radio signal or the first sequence;
        the third radio signal is used for at least one of determining whether the first bit block needs to be retransmitted, adjusting transmission timing for the UE, allocating resources of an uplink transmission for the UE, or configuring a subcarrier spacing of an uplink transmission for the UE; and
        M3 is used to determine at least one of a start time for a transmission of the third radio signal or time domain resources occupied by the third radio signal, the M3 is an element within the target set.

2. The method according to claim 1, wherein:
    a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms;
    a reference time length is greater than or equal to a first threshold and the target time length is equal to the first alternative time length, or, the reference time length is less than the first threshold and the target time length is equal to the second alternative time length;
    the reference time length is related to at least the first one of the M3, a number of RUs occupied by the second radio sub-signal, or a subcarrier spacing of RUs occupied by the second radio sub-signal;
    the first threshold is a pre-defined positive number; and
    an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

3. The method according to claim 1, further comprising:
    receiving second information;
    wherein:
        the second information is used to determine P2 second-type resources;
        radio resources occupied by the second radio signal belong to one of the P2 second-type resources, the P2 is a positive integer;
        at least one of a number of subcarriers, a subcarrier spacing, an MCS, or an RV corresponding to the second radio signal is related to the second-type resources where the second radio signal belongs; and
        radio resources comprise at least the former of time-frequency resources and code-domain resources.

4. The method according to claim 1, further comprising:
    receiving a fourth radio signal;
    wherein a measurement on the fourth radio signal is used to determine at least one of the time-frequency resources occupied by the first radio signal, or the radio resources occupied by the second radio signal.

5. A method in a base station for wireless communication, comprising:
    transmitting first information;
    receiving a first radio signal;
    receiving a second radio signal; and
    transmitting a third radio signal;
    wherein:
        the first information comprises P1 piece(s) of configuration information, each of the P1 piece(s) of configuration information is used to determine first-type resources, a first-type integer, and a first-type set, the P1 is a positive integer;
        the first radio signal comprises M1 first radio sub-signal(s), a first sequence is used to generate each of the M1 first radio sub-signal(s);
        the second radio signal comprises M2 second radio sub-signal(s), a first bit block is used to generate each of the M2 second radio sub-signal(s);
        the M1 is a positive integer, the M2 is an element within a target set;
        the first-type integer is a positive integer, each element within the first-type set is a positive integer;
        time-frequency resources occupied by the first radio signal belong to the first-type resources determined by first configuration information, the M1 is the first-type integer determined by the first configuration information, the target set is the first-type set determined by the first configuration information;

the first configuration information is one of the P1 piece(s) of configuration information;
time-frequency resources occupied by the second radio signal is related to at least one of the time-frequency resources occupied by the first radio signal or the first sequence;
the third radio signal is used for at least one of determining whether the first bit block needs to be retransmitted, adjusting transmission timing for a transmitter of the second radio signal, allocating resources of an uplink transmission for the transmitter of the second radio signal, or configuring a subcarrier spacing of an uplink transmission for the transmitter of the second radio signal; and
M3 is used to determine at least one of a start time for a transmission of the third radio signal or time domain resources occupied by the third radio signal, the M3 is an element within the target set.

6. The method according to claim 5, wherein:
a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms;
a reference time length is greater than or equal to a first threshold and the target time length is equal to the first alternative time length, or, the reference time length is less than the first threshold and the target time length is equal to the second alternative time length; and
the reference time length is related to at least the first one of the M3, a number of RUs occupied by the second radio sub-signal, or a subcarrier spacing of RUs occupied by the second radio sub-signal; the first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

7. The method according to claim 5, further comprising:
transmitting second information;
wherein:
the second information is used to determine P2 second-type resources;
radio resources occupied by the second radio signal belong to one of the P2 second-type resources, the P2 is a positive integer;
at least one of a number of subcarriers, a subcarrier spacing, an MCS, or an RV corresponding to the second radio signal is related to the second-type resources where the second radio signal belongs; and
the radio resources comprise at least the former of time-frequency resources and code domain resources.

8. The method according to claim 5, further comprising:
transmitting a fourth radio signal;
wherein a measurement on the fourth radio signal is used to determine at least one of the time-frequency resources occupied by the first radio signal, or the radio resources occupied by the second radio signal.

9. A UE used for wireless communication, comprising:
a first receiver, receiving first information;
a first transmitter, transmitting a first radio signal;
a second transmitter, transmitting a second radio signal; and
a second receiver, receiving a third radio signal;
wherein:
the first information comprises P1 piece(s) of configuration information, each of the P1 piece(s) of configuration information is used to determine first-type resources, a first-type integer, and a first-type set, the P1 is a positive integer;
the first radio signal comprises M1 first radio sub-signal(s), a first sequence is used to generate each of the M1 first radio sub-signal(s);
the second radio signal comprises M2 second radio sub-signal(s), a first bit block is used to generate each of the M2 second radio sub-signal(s);
the M1 is a positive integer, the M2 is an element within a target set;
the first-type integer is a positive integer, each element within the first-type set is a positive integer;
time-frequency resources occupied by the first radio signal belong to the first-type resources determined by first configuration information, the M1 is the first-type integer determined by the first configuration information, the target set is the first-type set determined by the first configuration information;
the first configuration information is one of the P1 piece(s) of configuration information;
time-frequency resources occupied by the second radio signal is related to at least one of the time-frequency resources occupied by the first radio signal or the first sequence;
the third radio signal is used for at least one of determining whether the first bit block needs to be retransmitted, adjusting transmission timing for the UE, allocating resources of an uplink transmission for the UE, or configuring a subcarrier spacing of an uplink transmission for the UE; and
M3 is used to determine at least one of a start time for a transmission of the third radio signal or time domain resources occupied by the third radio signal, the M3 is an element within the target set.

10. The UE used for wireless communication according to claim 9, wherein:
a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms;
a reference time length is greater than or equal to a first threshold and the target time length is equal to the first alternative time length, or, the reference time length is less than the first threshold and the target time length is equal to the second alternative time length;
the reference time length is related to at least the first one of the M3, a number of RUs occupied by the second radio sub-signal, or a subcarrier spacing of RUs occupied by the second radio sub-signal; and
the first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

11. The UE used for wireless communication according to claim 9, wherein:
the first receiver further receives second information;
the second information is used to determine P2 second-type resources;
radio resources occupied by the second radio signal belong to one of the P2 second-type resources, the P2 is a positive integer;
at least one of a number of subcarriers, a subcarrier spacing, an MCS, or an RV corresponding to the second radio signal is related to the second-type resources where the second radio signal belongs; and
the radio resources comprise at least the former of time-frequency resources and code domain resources.

12. The UE used for wireless communication according to claim 9, wherein:
the first receiver further receives a fourth radio signal; and
a measurement on the fourth radio signal is used to determine at least one of the time-frequency resources occupied by the first radio signal, or the radio resources occupied by the second radio signal.

13. A base station used for wireless communication, comprising:
a third transmitter, transmitting first information;
a third receiver, receiving a first radio signal;
a fourth receiver, receiving a second radio signal; and
a fourth transmitter, transmitting a third radio signal;
wherein:
the first information comprises P1 piece(s) of configuration information, each of the P1 piece(s) of the configuration information is used to determine first-type resources, a first-type integer, and a first-type set, the P1 is a positive integer;
the first radio signal comprises M1 first radio sub-signal(s), a first sequence is used to generate each of the M1 first radio sub-signal(s);
the second radio signal comprises M2 second radio sub-signal(s), a first bit block is used to generate each of the M2 second radio sub-signal(s);
the M1 is a positive integer, the M2 is an element within a target set;
the first-type integer is a positive integer, each element within the first-type set is a positive integer;
time-frequency resources occupied by the first radio signal belong to the first-type resources determined by first configuration information, the M1 is the first-type integer determined by the first configuration information, the target set is the first-type set determined by the first configuration information;
the first configuration information is one of the P1 piece(s) of configuration information;
time-frequency resources occupied by the second radio signal is related to at least one of the time-frequency resources occupied by the first radio signal or the first sequence;
the third radio signal is used for at least one of determining whether the first bit block needs to be retransmitted, adjusting transmission timing for a transmitter of the second radio signal, allocating resources of an uplink transmission for the transmitter of the second radio signal, or configuring a subcarrier spacing for an uplink transmission for the transmitter of the second radio signal; and
M3 is used to determine at least one of a start time for a transmission of the third radio signal by the transmitter of the third radio signal or time domain resources occupied by the third radio signal, the M3 is an element within the target set.

14. The base station used for wireless communication according to claim 13, wherein:
a virtual radio signal comprises M3 second radio sub-signal(s), a length of a time interval between an end time for a transmission of the virtual radio signal and a start time for a transmission of the third radio signal is greater than or equal to a target time length, the target time length is equal to one of a first alternative time length or a second alternative time length, the first alternative time length is greater than the second alternative time length, the second alternative time length is greater than 0 ms;
a reference time length is greater than or equal to a first threshold and the target time length is equal to the first alternative time length, or, the reference time length is less than the first threshold and the target time length is equal to the second alternative time length;
the reference time length is related to at least the first one of the M3, a number of RUs occupied by the second radio sub-signal, or a subcarrier spacing of RUs occupied by the second radio sub-signal; and
the first threshold is a pre-defined positive number; an RU comprises K1 consecutive multicarrier symbols in time domain and comprises K2 consecutive subcarrier(s) in frequency domain, the K1 is equal to one of 14, 28, 56 or 112, the K2 is equal to one of 1, 3, 6 or 12.

15. The base station used for wireless communication according to claim 13, wherein:
the third transmitter further transmits second information;
the second information is used to determine P2 second-type resources;
radio resources occupied by the second radio signal belongs to one of the P2 second-type resources, the P2 is a positive integer;
at least one of a number of subcarriers, a subcarrier spacing, an MCS, or an RV corresponding to the second radio signal is related to the second-type resources where the second radio signal belongs; and
the radio resources comprise at least the former of time-frequency resources and code domain resources.

16. The base station used for wireless communication according to claim 13, wherein:
the third transmitter further transmits a fourth radio signal; and
a measurement on the fourth radio signal is used to determine at least one of the time-frequency resources occupied by the first radio signal, or the radio resources occupied by the second radio signal.

* * * * *